United States Patent
Nam et al.

(10) Patent No.: US 7,567,623 B2
(45) Date of Patent: Jul. 28, 2009

(54) DIFFERENTIAL SPACE-TIME BLOCK CODING APPARATUS WITH HIGH TRANSMISSION RATE AND METHOD THEREOF

(75) Inventors: Seung-Hoon Nam, Seoul (KR); Jae-Hak Chung, Seoul (KR); Chan-Soo Hwang, Yongin-si (KR); Young-Ho Jung, Yongin-si (KR); Vahid Tarokh, Cambridge, MA (US)

(73) Assignee: Samsung Electronics Co., Ltd (KR)

( * ) Notice: Subject to any disclaimer, the term of this patent is extended or adjusted under 35 U.S.C. 154(b) by 537 days.

(21) Appl. No.: 11/206,563

(22) Filed: Aug. 18, 2005

(65) Prior Publication Data

US 2006/0056539 A1    Mar. 16, 2006

(30) Foreign Application Priority Data

Sep. 13, 2004    (KR) .................. 10-2004-0073207

(51) Int. Cl.
*H04L 27/00* (2006.01)
*H04K 1/02* (2006.01)

(52) U.S. Cl. .................. 375/296; 375/295; 375/299; 375/316

(58) Field of Classification Search .................. 375/295, 375/296, 299, 316
See application file for complete search history.

(56) References Cited

U.S. PATENT DOCUMENTS 6,088,408 A * 7/2000 Calderbank et al. ......... 375/347

6,178,196 B1 * 1/2001 Naguib et al. ............... 375/148

(Continued)

FOREIGN PATENT DOCUMENTS

CN    1484899    3/2004

(Continued)

OTHER PUBLICATIONS

"Differential space time block codes using nonconstant modulus constellations"; Chan-Soo Hwang; Seung Hoon Nam; Jaehak Chung; Tarokh, V.; Signal Processing, IEEE Transactions on [see also Acoustics, Speech, and Signal Processing, IEEE Transactions on, vol. 51, Issue 11, Nov. 2003 pp. 2955-2964.*

(Continued)

*Primary Examiner*—Chieh M Fan
*Assistant Examiner*—Jason M. Perilla
(74) *Attorney, Agent, or Firm*—The Farrell Law Firm, PC

(57) ABSTRACT

Disclosed is a differential space-time block coding apparatus with a high transmission rate in a wireless communication system employing multiple transmit antennas and a method thereof. The differential space-time block coding method includes the steps of, when elements of a transmission matrix $B_{43}^v$ are transmitted in a predetermined block (a $v^{th}$ block) through a predetermined transmit antenna at a predetermined time, modulating a symbol $S_v$ of inputted binary data to a symbol $S_{v+1}$, creating a matrix $S_{44}^{v+1}$ in a block (a $(v+1)^{th}$ block) following the predetermined block by substituting the modulated symbol for the matrix $P_{44}$, and then, in order to perform a differential encoding function, multiplying the matrix $B_{43}^v$ by the matrix $S_{44}^{v+1}$ so as to calculate a new matrix $B_{43}^{v+1}$ to be transmitted in the $(v+1)^{th}$ block.

12 Claims, 4 Drawing Sheets

U.S. PATENT DOCUMENTS

| | | | | |
|---|---|---|---|---|
| 6,363,121 | B1* | 3/2002 | Hochwald et al. | 375/260 |
| 6,452,981 | B1* | 9/2002 | Raleigh et al. | 375/299 |
| 6,459,740 | B1* | 10/2002 | Lo | 375/259 |
| 6,542,556 | B1* | 4/2003 | Kuchi et al. | 375/299 |
| 6,594,473 | B1* | 7/2003 | Dabak et al. | 455/101 |
| 6,693,982 | B1* | 2/2004 | Naguib et al. | 375/341 |
| 6,724,842 | B1* | 4/2004 | Hochwald et al. | 375/347 |
| 6,801,579 | B1* | 10/2004 | Hassibi et al. | 375/264 |
| 6,865,237 | B1* | 3/2005 | Boariu et al. | 375/295 |
| 7,103,326 | B2* | 9/2006 | Wu et al. | 455/101 |
| 7,120,200 | B2* | 10/2006 | Alamouti et al. | 375/267 |
| 7,123,887 | B2* | 10/2006 | Kim et al. | 455/103 |
| 7,190,734 | B2* | 3/2007 | Giannakis et al. | 375/267 |
| 7,227,905 | B2* | 6/2007 | Viswanathan | 375/267 |
| 7,248,559 | B2* | 7/2007 | Ma et al. | 370/208 |
| 7,292,644 | B2* | 11/2007 | Whang et al. | 375/267 |
| 7,296,163 | B2* | 11/2007 | Cybenko | 713/190 |
| 7,308,035 | B2* | 12/2007 | Rouquette et al. | 375/267 |
| 7,310,304 | B2* | 12/2007 | Mody et al. | 370/208 |
| 7,333,549 | B2* | 2/2008 | Lee et al. | 375/260 |
| 7,356,090 | B2* | 4/2008 | Hwang et al. | 375/295 |
| 2002/0122502 | A1* | 9/2002 | El-Gamal et al. | 375/267 |
| 2002/0136327 | A1* | 9/2002 | El-Gamal et al. | 375/308 |
| 2003/0012318 | A1* | 1/2003 | Piirainen | 375/358 |
| 2003/0026348 | A1* | 2/2003 | Llang et al. | 375/267 |
| 2003/0026349 | A1* | 2/2003 | Onggosanusi et al. | 375/267 |
| 2003/0035490 | A1* | 2/2003 | Gollamudi | 375/267 |
| 2003/0072395 | A1* | 4/2003 | Jia et al. | 375/341 |
| 2003/0228850 | A1* | 12/2003 | Hwang | 455/101 |
| 2004/0014431 | A1* | 1/2004 | Lo | 455/73 |
| 2004/0057530 | A1* | 3/2004 | Tarokh et al. | 375/267 |
| 2004/0066761 | A1* | 4/2004 | Giannakis et al. | 370/329 |
| 2004/0071222 | A1* | 4/2004 | Liang et al. | 375/267 |
| 2004/0120274 | A1* | 6/2004 | Petre et al. | 370/320 |
| 2004/0120416 | A1* | 6/2004 | Pauli et al. | 375/267 |
| 2004/0131041 | A1* | 7/2004 | Tirkkonen et al. | 370/349 |
| 2004/0132496 | A1* | 7/2004 | Kim et al. | 455/562.1 |
| 2004/0208254 | A1* | 10/2004 | Lee et al. | 375/260 |
| 2004/0213353 | A1* | 10/2004 | Hwang et al. | 375/267 |
| 2005/0063483 | A1* | 3/2005 | Wang et al. | 375/267 |
| 2005/0089112 | A1* | 4/2005 | Piechocki et al. | 375/267 |
| 2005/0130664 | A1* | 6/2005 | Sang et al. | 455/450 |
| 2005/0135498 | A1* | 6/2005 | Yee | 375/267 |
| 2005/0174932 | A1* | 8/2005 | Deng et al. | 370/208 |
| 2006/0153389 | A1* | 7/2006 | Temerinac et al. | 381/2 |
| 2006/0232416 | A1* | 10/2006 | Bauch | 340/572.7 |
| 2006/0274846 | A1* | 12/2006 | Bauch | 375/267 |
| 2008/0063110 | A1* | 3/2008 | Averbuch et al. | 375/295 |

FOREIGN PATENT DOCUMENTS

KR    1020040014441    2/2004

OTHER PUBLICATIONS

"Differential space time block code scheme for cooperative relays in multi-hop sensor networks"; Lichuan Liu; Hongya Ge; Ott, T.J.; Military Communications Conference, 2005. MILCOM 2005. IEEE Oct. 17-20, 2005 pp. 436-441 vol. 1.*

"Differential space-time modulation with maximum spatio-spectral diversity" Hongbin Li; Communications, 2003. ICC '03. IEEE International Conference on vol. 4, May 11-15, 2003 pp. 2588-2592 vol. 4.*

* cited by examiner

DIFFERENTIAL SPACE-TIME BLOCK CODING APPARATUS WITH HIGH TRANSMISSION RATE AND METHOD THEREOF

PRIORITY

This application claims priority to an application entitled "Differential Space-Time Block Coding Apparatus with High Transmission Rate and Method Thereof" filed in the Korean Intellectual Property Office on Sep. 13, 2004 and assigned Serial No. 2004-73207, the contents of which are incorporated herein by reference.

BACKGROUND OF THE INVENTION

1. Field of the Invention

The present invention relates to a wireless communication system using multiple transmission antennas, and more particularly to differential space-time block codes (D-STBCs) with a high symbol transmission rate.

2. Description of the Related Art

Generally, the primary concern in communications is how efficiently and reliably data can be transmitted through a channel. Recent developments for next generation multimedia mobile communication systems require high-speed communication systems capable of processing and transmitting various types of information such as image data and wireless data, in addition to voice communication To do so, it is necessary to enhance system efficiency by employing a suitable channel coding scheme for the system.

As opposed to a wired channel environment, a radio channel environment is prone to errors from various causes, such as multi-path interference, shadowing, propagation attenuation, time-varying noises, and interference and fading. These errors cause information loss, making the communication system less reliable. As a result, research and study in this area focuses on a solution to the above-described problems.

Tarokh suggested space-time block codes (STBCs) as a part of the above-described studies, that provide the maximum order of a diversity and facilitate maximum likelihood (ML) decoding with only simple linear processing in a reception terminal in a wireless communication system employing multiple transmit antennas.

In the STBCs, symbols input as blocks are output through a transmission matrix. Herein, the columns and rows of the transmission matrix represent time and antennas, respectively. Therefore, symbols on the columns of the transmission matrix represent signals transmitted from different antennas at the same time, and symbols on the rows of the transmission matrix represent signals transmitted from one antenna at different times. Also, there are merits such as maximum diversity and simple decoding in the STBCs. That is, the STBCs can obtain a large signal to noise ratio (SNR) gain without increasing system complexity, as compared with a system using only one antenna.

As a result, methods where a transmission terminal acquires transmit diversity gain by using the STBCs to overcome fading and improve reliability of transmission signals, have been actively researched and studied.

The conventional STBCs described above are used when the reception terminal has channel information, and real systems estimate channel information with a training symbol. However, a transmission method excluding use of channel information may be more advantageous when it is difficult to estimate a channel or where channel estimation creates excessive overhead due to rapid change of the channel.

Tarokh suggested differential space-time block codes (D-STBCs) with respect to two transmit antennas. Also, the suggestion for the D-STBCs of Tarokh shows a case of employing any number of transmit antennas. Generally, such D-STBCs have performance degradation of about 3 dB and similar encoding/decoding complexity as compared with the conventional coherent space-time block codes.

However, in transmission of a complex signal, the conventional D-STBC has a transmission rate of 1 symbol/transmission with respect to two transmit antennas and has a transmission rate of 0.75 symbol/transmission with respect to at least three transmit antennas. The above described restriction in the transmission rate occurs because a transmit antenna is utilized to acquire a diversity gain only. Accordingly, it is more advantageous in regards of system performance that a transmission terminal pursues a (spatial) multiplexing gain while sacrificing the diversity gain to obtain a high transmission rate by transmitting a greater number of symbols where the reception terminal employs multiple receive antennas.

Hereinafter, description about the conventional D-STBC will be given with reference to FIG. 1.

FIG. 1 is a schematic block diagram for the conventional D-STBC. Specifically, FIG. 1 is a block diagram showing a structure of the transmission terminal employing the conventional D-STBC.

Referring to FIG. 1, the transmission terminal includes a symbol mapper 101, a space-time encoder 103, a multiplier 105, a delayer 107, and a distributor 108. Also, FIG. 1 illustrates a structure of the transmission terminal of a D-STBC system having N transmit antennas.

Regarding operation of the transmission terminal, input data $(s_1, s_2, \ldots, s_k)$ provided through the symbol mapper 101 are created as a signal $S_v$ for v-th transmission block having P×N symbols by the space-time encoder 103. The transmission matrix $D_{v+1}$ is obtained by multiplying the signal $S_v$ by the delayed version of transmission matrix $D_v$ for v-th block which is provided by the delay block 107. The encoded symbol in the transmission matrix $D_{v+1}$ is transmitted through each antenna, that is, a first antenna to an $N^{th}$ antenna. In addition, the N antennas simultaneously transmit N symbols for every time slot with the same symbol interval during P time slots.

As described above, the transmission terminal of the system employing the conventional D-STBC includes two processes. The first is a process of encoding data to be transmitted by using STBCs and the second, a process of differentially encoding and transmitting a space-time block coded matrix.

Hereinafter, it is assumed that a wireless communication system employs eight or fewer transmission, or transmit antennas. Also, for the purpose of explanation, it is assumed the reception terminal employs one reception, or receive antenna. However, it is possible that the reception terminal be capable of employing multiple receive antennas.

Under the above assumptions, when two transmit antennas are used, two symbol intervals are transmitted as one unit, and when three or four transmit antennas are used, four symbol intervals are transmitted as one unit. Further, when five to eight transmit antennas are used, eight symbol intervals are transmitted as one unit. Herein, matrices such as Equation (1) to Equation (4) are defined as:

$$G_{22} = \begin{bmatrix} a_1 & a_2 \\ -a_2 & a_1 \end{bmatrix}, B_{22} = \begin{bmatrix} a_1 & a_2 \\ -a_2^* & a_1^* \end{bmatrix} \quad (1)$$

-continued $$G_{43} = \begin{bmatrix} a_1 & a_2 & a_3 \\ -a_2 & a_1 & -a_4 \\ -a_3 & a_4 & a_1 \\ -a_4 & -a_3 & a_2 \end{bmatrix}, G_{44} = \begin{bmatrix} a_1 & a_2 & a_3 & a_4 \\ -a_2 & a_1 & -a_4 & a_3 \\ -a_3 & a_4 & a_1 & -a_2 \\ -a_4 & -a_3 & a_2 & a_1 \end{bmatrix} \quad (2)$$

$$B_{43} = \begin{bmatrix} a_1 & a_2 & a_3 \\ -a_2^* & a_1^* & 0 \\ -a_3^* & 0 & a_1^* \\ 0 & -a_3^* & a_2^* \end{bmatrix}, B_{44} = \begin{bmatrix} a_1 & a_2 & a_3 & 0 \\ -a_2^* & a_1^* & 0 & a_3 \\ -a_3^* & 0 & a_1^* & -a_2 \\ 0 & -a_3^* & a_2^* & a_1 \end{bmatrix} \quad (3)$$

$$G_{88} = \begin{bmatrix} a_1 & a_2 & a_3 & a_4 & a_5 & a_6 & a_7 & a_8 \\ -a_2 & a_1 & a_4 & -a_3 & a_6 & -a_5 & -a_8 & a_7 \\ -a_3 & -a_4 & a_1 & a_2 & a_7 & a_8 & -a_5 & -a_6 \\ -a_4 & a_3 & -a_2 & a_1 & a_8 & -a_7 & a_6 & -a_5 \\ -a_5 & -a_6 & -a_7 & -a_8 & a_1 & a_2 & a_3 & a_4 \\ -a_6 & a_5 & -a_8 & a_7 & -a_2 & a_1 & -a_4 & a_3 \\ -a_7 & a_8 & a_5 & -a_6 & -a_3 & a_4 & a_1 & -a_2 \\ -a_8 & -a_7 & a_6 & a_5 & -a_4 & -a_3 & a_2 & a_1 \end{bmatrix} \quad (4)$$

Herein, the matrix $G_{43}$ is obtained by using the first three columns of the matrix $G_{44}$. The matrix $B_{43}$ is obtained by using the first three columns of the matrix $B_{44}$. A transmission matrix $G_{8N}$ for a predetermined constant N (N=5, 6, 7, 8) is obtained as a sub-matrix formed by using the first N columns of the matrix $G_{88}$.

The matrices $B_{22}$, $B_{43}$, and $B_{44}$ create D-STBCs for transmitting complex signals through N number of transmit antennas, where N=2, 3, and 4, respectively. In addition, the matrices $G_{22}$, $G_{43}$, $G_{44}$ and $G_{8N}$ create D-STBCs for transmitting real signals through N number of transmit antennas, where N=2, 3, 4, 5, 6, 7, and 8, respectively. Herein, the matrices are used for coherent STBCs, designed in such a manner that the coherent STBCs have orthogonality.

Used signal constellation previously determines a transmission matrix to be selected depending on the number of transmit antennas used in the transmission terminal and depending on whether a complex or real signal is transmitted. Hereinafter, an example of using the matrix $B_{43}$ from among the matrices, that is, transmitting the complex signal through three antennas, will be described. The manner described below may be applied to a case of transmitting the real signal, or using a different number of transmit antennas.

First, signal transmission starts from selection of a predetermined symbol $S_1(S_1=(s_{1,1}, s_{1,2}, s_{1,3}))$ and substitution of the selected symbol for the transmission matrix $B_{43}^1$. An $(i,t)^{th}$ element of the matrix $B_{43}^1$ in a first block is transmitted through an $i^{th}$ transmit antenna at a $t^{th}$ time. At this time, symbols transmitted in the first block have no information and are not known to the reception terminal.

Hereinafter, reflexive description about symbols transmitted after a $v^{th}$ block will be described.

That is, it is assumed that the transmission matrix $B_{43}^v$ in the $v^{th}$ block was transmitted in the same manner as the first block. In addition, inputted binary data are modulated to a $v+1^{th}$ symbols, that is, symbols $S_{v+1}=(s_{v+1,1}, s_{v+1,2}, s_{v+1,3})$, and the modulated symbols are substituted for elements '$a_1$', '$a_2$', and '$a_3$' of the matrix $B_{44}$ so as to create a matrix $S_{44}^{v+1}$ in a $v+1^{th}$ block. Then, the matrix $B_{43}^v$, having been transmitted in a previous block, is multiplied by the matrix $S_{44}^{v+1}$ so as to create a new matrix $B_{43}^{v+1}$ to be transmitted in the $(v+1)^{th}$ block to perform a differential encoding function.

In a summary of this, the matrix $B_{43}^{v+1}$ can be defined by Equation (5):

$$B_{43}^{v+1}=S_{44}^{v+1}B_{43}^v \quad (5)$$

Herein, the $(i,t)^{th}$ element of the matrix $B_{43}^{v+1}$ is transmitted through an $i^{th}$ transmit antenna at a $t^{th}$ time. The reason for the substitution of elements '$a_1$', '$a_2$', and '$a_3$' of the matrix $B_{44}$ is that the matrix $B_{44}$ has the same number of rows as the matrix $B_{43}$ and is the smallest matrix having orthogonality. Herein, if a differential space-time block coding is realized by using the matrix $G_{8N}$ for each transmit antenna when the number of the transmit antennas is N (N=5, 6, 7, or 8), the matrix $S_{44}^{v+1}$ in Equation (5) must be replaced with the matrix $S_{88}^{v+1}$ in which eight symbols $S_{v+1}$ ($S_{v+1}=(s_{v+1,1}, s_{v+1,2}, \ldots, s_{v+1,8})$) are substituted for elements of the matrix $G_{88}$.

Below, the case where a signal transmitted from the transmission terminal is received in the reception terminal as described above will be explained.

First, if a channel gain $h(h=(h_1, h_2, h_3)^T)$ is time-invariant with respect to two connected blocks, a received signal in a $v^{th}$ block is defined as Equation (6):

$$X_v=B_{43}^v h+W_v \quad (6)$$

Herein, the $X_v(X_v=(x_{v,1}, x_{v,2}, x_{v,3}, x_{v,4})^T)$ denotes a signal received during four symbol intervals, and the $W_v(W_v=(w_{v,1}, w_{v,2}, w_{v,3}, w_{v,4})^T)$ denotes a noise signal. Similarly, the signal $X_{v+1}$ is received in the $(v+1)^{th}$ block as defined in Equation (7):

$$X_{v+1}=B_{43}^{v+1}h+W_{v+1} \quad (7)$$

Herein, when Equation (5) and Equation (6) are substituted into Equation (7), the receive signal $X_{v+1}$ in the $(v+1)^{th}$ block is represented as Equation (8):

$$X_{v+1}=B_{43}^{v+1}h+W_{v+1}=S_{44}^{v+1}B_{43}^v h+W_{v+1}=S_{44}^{v+1}X_v+N_{v+1} \quad (8)$$

Herein, the noise component $N_{v+1}$ can be defined as Equation (9):

$$N_{v+1}=-S_{44}^{v+1}W_v+W_{v+1} \quad (9)$$

Herein, since the matrix $S_{44}^{v+1}$ has orthogonality, the variance of the noise component in Equation (8), that is, an additive white Gaussian noise (AWGN) is double and the distribution of the noise component is steadily maintained.

The receive signal in Equation (8) has the same form as a receive signal of the conventional coherent STBC using the matrix $B_{44}$. That is, if the matrix $X_v$ is a channel gain, Equation (8) has the same form as mathematics formulas of the conventional reception terminal receiving the receive signal $X_{v+1}$. Accordingly, since the variance of the noise signal is double, the above described method can acquire diversity gains proportional to the number of transmit antennas and simplify the reception terminal structure even though performance is degraded by about 3 dB as compared with the coherent STBC.

However, the conventional D-STBC peculiarly arranges symbols in a transmission matrix for maintaining orthogonality of STBCs, so that the maximum transmission rate is limited. In addition, when the above described method uses three or four transmission antennas with respect to a complex signal by way of example, the maximum transmission rate is 3/4(0.75 symbol/transmission) because three symbols are transmitted during four symbol intervals. Therefore, the transmission rate is lowered. Furthermore, although the conventional technique suggests a QAM transmission scheme replacing a PSK transmission scheme, the symbol transmission rate is still 0.75 symbol/transmission.

Accordingly, a new D-STB is desirable, that has a symbol transmission rate higher than that of the conventional D-STBC while maintaining orthogonality of the conventional D-STBC.

SUMMARY OF THE INVENTION

Accordingly, the present invention has been made to solve the above-mentioned problems occurring in the prior art, and an object of the present invention is to provide differential space-time block codes having a relatively high symbol transmission rate in a communication system using multiple transmit antennas.

Another object of the present invention is to provide differential space-time block codes having a relatively high symbol transmission rate and maintaining orthogonality of a transmission matrix in a communication system using multiple transmit antennas.

Still another object of the present invention is to provide differential space-time block codes capable of improving performance in view of a bit error rate as compared with the conventional differential space-time block codes in a communication system using at least two receives antennas.

Yet another object of the present invention is to provide differential space-time block codes and an algorithm relating to the differential block codes, which can reduce complexity of a reception terminal without increasing complexity of a transmission terminal when differential modulation/demodulation is used in an environment or a system in which channel information is invalid in the transmission terminal and the reception terminal.

To accomplish the above objects, there is provided a differential space-time block coding apparatus with a high symbol transmission rate in a wireless communication system which includes a symbol mapper, a delayer, and a distributor and uses multiple receive antennas, the apparatus including a restricted symbol calculating unit for receiving a plurality of symbols mapped and outputted from the symbol mapper and calculating restricted symbols by using free symbols including real information which are the received symbols, and a space-time encoder for receiving the symbols sent from the symbol mapper and the restricted symbols sent from the restricted symbol calculating unit and space-time coding the received symbols.

In differential space-time block coding apparatus, when elements of a transmission matrix $B_{43}{}^v$ are transmitted in a predetermined block (a $v^{th}$ block) through a predetermined transmit antenna at a predetermined time, a symbol $S_v$ of inputted binary data is modulated to a symbol $S_{v+1}$ and the modulated symbol is substituted for $P_{44}$ so as to create a matrix $S_{44}{}^{v+1}$ in a block (a $v+1^{th}$ block) following the predetermined block, and then, in order to perform a differential encoding function, the matrix $B_{43}{}^v$ is multiplied by the matrix $S_{44}{}^{v+1}$ so as to calculate a new matrix $B_{43}{}^{v+1}$ to be transmitted in the $(v+1)^{th}$ block by a following Equation, $B_{43}{}^{v+1}=S_{44}{}^{v+1} B_{43}{}^v$.

According to another aspect of the present invention, there is provided a differential space-time block coding method with a high symbol transmission rate in a wireless communication system which includes a symbol mapper, a delayer, and a distributor and uses multiple receive antennas, the differential space-time block coding method including receiving a plurality of symbols mapped and outputted from the symbol mapper and calculating restricted symbols by using free symbols including real information which are the received symbols, and receiving the symbols sent from the symbol mapper and the restricted symbols sent from the restricted symbol calculating unit and space-time coding the received symbols.

In a differential space-time block coding method, when elements of a transmission matrix $B_{43}{}^v$ are transmitted in a predetermined block (a $v^{th}$ block) through a predetermined transmit antenna at a predetermined time, a symbol $S_v$ of inputted binary data is modulated to a symbol $S_{v+1}$ and the modulated symbol is substituted for $P_{44}$ so as to create a matrix $S_{44}{}^{v+1}$ in a block (a $(v+1)^{th}$ block) following the predetermined block, and then, in order to perform a differential encoding function, the matrix $B_{43}{}^v$ is multiplied by the matrix $S_{44}{}^{v+1}$ so as to calculate a new matrix $B_{43}{}^{v+1}$ to be transmitted in the $(v+1)^{th}$ block by a following Equation, $B_{43}{}^{v+1}=S_{44}{}^{v+1} B_{43}{}^v$.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Figure 1:
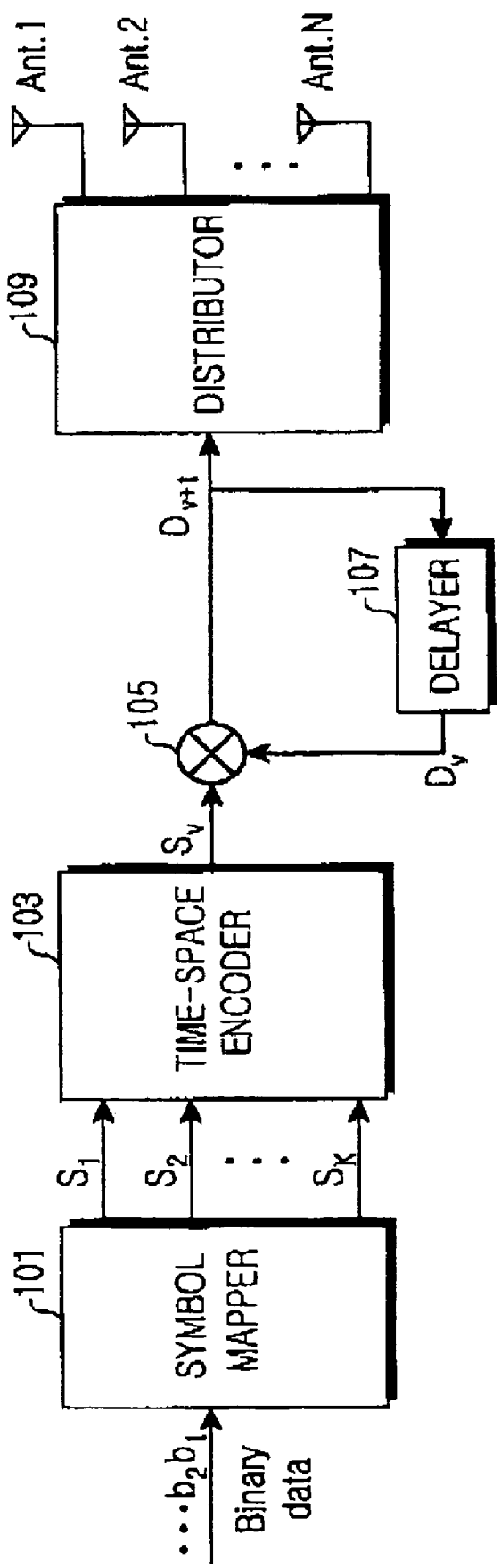
FIG. 1 is a schematic block diagram for the conventional D-STBCs.

Hereinafter, a preferred embodiment of the present invention will be described in detail with reference to the accompanying drawings. Note that the same or similar components in drawings are designated by the same reference numerals as far as possible although they are shown in different drawings. In the following description of the present invention, a detailed description of known functions and configurations incorporated herein will be omitted when it may make the subject matter of the present invention unclear.

In the following description of the present invention, new differential space-time block codes (D-STBCs) are disclosed, for transmitting a greater amount of symbols while maintaining orthogonality of the D-STBC as compared with the conventional method. In a method according to an embodiment of the present invention, when a QPSK modulation scheme is employed, a high symbol transmission rate (e.g., 1.5 symbol/transmission) can be obtained with respect to three or four transmit antennas. In effect, the present invention has a double symbol transmission rate as compared with the conventional method. The inventive method is realized by applying it to an algorithm allowing space-time block codes to maintain orthogonality.

Accordingly, in a telecommunication system using at least three transmit antennas, the present invention described below relates to D-STBCs of the inventive method capable of acquiring a higher symbol transmission rate by overcoming a symbol transmission rate limitation of the conventional D-STBC when a complex signal is transmitted.

As described above, the conventional D-STBC has a maximum transmission rate of 1 symbol/transmission with two transmit antennas and the maximum transmission rate of 0.75 symbol/transmission with at least three transmit antennas when a complex signal is transmitted. In contrast, the present invention uses a restriction formula capable of maintaining orthogonality while transmitting more symbols than the conventional D-STBC, so a high transmission rate is obtained at the expense of diversity gain.

For example, a system employing a QPSK modulation scheme according to an embodiment of the present invention, and three or four transmit antennas acquires a transmission rate of 1.5 symbol/transmission, effectively doubling the maximum transmission rate of the conventional method. Accordingly, since the D-STBC according to the present invention can enhance symbol transmission rate while sacrificing the order of transmit diversity, the D-STBC shows superior performance in an environment capable of acquiring a receive diversity by using multiple receive antennas.

Hereinafter, an apparatus and a method for employing the D-STBC providing a high transmission rate will be described with reference to FIG. 2 according to a preferred embodiment of the present invention.

Figure 2:
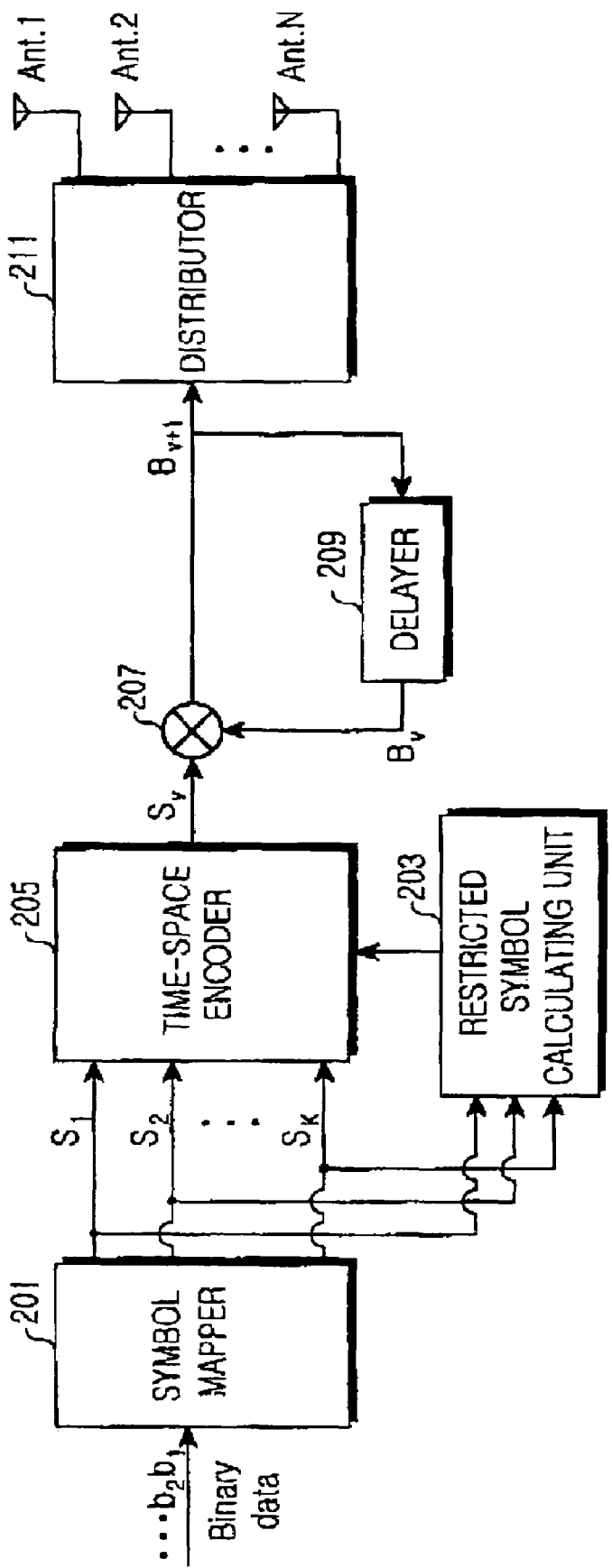
FIG. 2 illustrates a structure of a transmission terminal employing D-STBCs according to an embodiment of the present invention.

FIG. 2 illustrates a structure of a transmission terminal employing the D-STBC according to an embodiment of the present invention.

It can be understood that a wireless communication system using the D-STBC of the present invention has a structure similar to that of a wireless communication system using the conventional D-STBC as shown in FIG. 1.

The apparatus includes a symbol mapper 201, a restricted symbol calculating unit 203, a space time encoder 205, a mulitplier 207, a delayer 209, a distributor 211, and a plurality of transmit antennas. The structure of the apparatus is divided into two parts, one part for encoding data to be transmitted by using space-time block codes, and the other part for differentially encoding and transmitting a space-time block coded matrix. According to an embodiment of the present invention, a new space-time block code structure replaces the orthogonal space-time block code structure of the conventional differential space-time block coding. Transmission matrices providing a transmission rate of 1.5 symbol/transmission with respect to at most four transmit antennas are defined by Equation (10) and Equation (11):

$$P_{22} = \begin{bmatrix} a_1 & a_2 \\ a_3 & a_4 \end{bmatrix}, a_1 a_2^* + a_3 a_4^* = 0, a_4 = -2a_1^* a_2 a_3 \quad (10)$$

$$P_{44} = \begin{bmatrix} a_1 & a_2 & a_5 & a_6 \\ a_2^* & -a_1^* & a_6^* & -a_5^* \\ a_3 & a_4 & a_7 & a_8 \\ a_4^* & -a_3^* & a_8^* & -a_7^* \end{bmatrix} = \begin{bmatrix} A_1 & A_3 \\ A_2 & A_4 \end{bmatrix}, \quad (11)$$

$$A_1 A_2^H + A_3 A_4^H = 0, A_4 = -2A_2 A_1^H A_3$$

The transmission matrices $P_{22}$ and $P_{44}$ are preferably unitary matrices having orthogonality with respect to a complex signal. In view of the space-time block code structure, it is very important for the transmission matrix to have orthogonality so that the order of transmit diversity can be acquired at the maximum transmission rate and receiver complexity can be reduced. In addition, if the transmission matrix is unitary, the transmission terminal does not require additional normalization because transmit power is constant in each block.

Accordingly, the transmission matrix of the inventive method is designed in such a manner that the transmission matrix has a unitary property similar to the case of conventional differential space-time block codes. In Equation (10) of the transmission matrix, symbols carrying information in the transmission matrix $P_{22}$ are '$a_1$', '$a_2$', and '$a_3$'. A symbol '$a_4$' is created through combination of the three symbols in the restriction formula. Herein, the symbols '$a_1$', '$a_2$', and '$a_3$' denote free symbols, and the symbol '$a_4$' denotes a restricted symbol.

The restriction formula $a_1 a_2^* + a_3 a_4^* = 0$ makes the transmission matrix $P_{22}$ unitary in Equation (10). Similarly, in the transmission matrix $P_{44}$, the symbols carrying information are '$a_1$', '$a_2$', '$a_3$', '$a_4$', '$a_5$', and '$a_6$', and symbols '$a_7$' and '$a_8$' are created through a combination of the six symbols in a restriction formula. Herein, the symbols '$a_1$', '$a_2$', '$a_3$', '$a_4$', '$a_5$', and '$a_6$' denote free symbols, and the symbols '$a_7$' and '$a_8$' denote restricted symbols.

The restriction formula makes the matrix $P_{44}$ unitary. In detail, the free symbols '$a_1$', '$a_2$', '$a_3$', '$a_4$', '$a_5$', and '$a_6$' correspond to symbols obtained by modulating binary data to be transmitted through a QAM scheme, and the restricted symbols '$a_7$' and '$a_8$' are determined according to the free symbols '$a_1$', '$a_2$', '$a_3$', '$a_4$', '$a_5$', and '$a_6$' satisfying $A_1 A_2^H + A_3 A_4^H = 0$ in Equation (11), which makes the transmission matrix $P_{44}$ unitary.

The inventive method replaces the conventional matrix $B_{22}$ used in the conventional method with the matrix $P_{22}$ in a system using two transmit antennas and replaces the conventional matrix $B_{44}$ with the matrix $P_{44}$ in a system using three or four transmit antennas, thereby realizing the differential space-time code. It is assumed that the reception terminal includes at least two receive antennas in the following description of the present invention.

Hereinafter, when a system using three transmit antennas transmits a complex signal, operation according to an embodiment of the present invention will be described. However, since the present invention should not be limited to three transmit antennas and the complex signal, the same operation principle is applied to a different number of transmit antennas or a case of transmitting a real signal. Accordingly, a redundant description of the cases is omitted.

First, when a complex signal is transmitted through the three transmit antennas, information is sent through the matrix $P_{44}$. At this time, signal transmission starts by selecting a predetermined phase shifting modulation symbol $S_1(S_1=(s_{1,1}, s_{1,2}, s_{1,3}))$ and substituting the symbol for the transmission matrix $B_{43}^1$ to enable a differential transmitting/receiving method. An $(i,t)^{th}$ element of the matrix $B_{43}^1$ in a first block is transmitted through an $i^{th}$ transmit antenna at $t^{th}$ time. At this time, symbols transmitted in a first block have no information and are not known to the reception terminal.

Transmission of the matrix $B_{43}^1$ in the first block is performed by the same operation as the conventional differential space-time block coding.

Next, a reflexive description of symbols transmitted after the $v^{th}$ block will be described below. That is, it is assumed that the transmission matrix $B_{43}^v$ in the $v^{th}$ block was transmitted in the same manner as the first block. In addition, inputted binary data are modulated to symbols $S_{v+1}$ $(S_{v+1}=(s_{v+1,1}, s_{v+1,2}, s_{v+1,3}, s_{v+1,4}, s_{v+1,5}, s_{v+1,6}))$, the modulated symbols are substituted for the symbols '$a_1$', '$a_2$', '$a_3$', '$a_4$', '$a_5$', and '$a_6$' of the matrix $P_{44}$, and the matrix $S_{44}^{v+1}$ is created in $v+1^{th}$ block. The matrix $B_{43}^v$, having been transmitted in a previous block is multiplied by the matrix $S_{44}^{v+1}$ to create a matrix $B_{43}^{v+1}$ to be transmitted in the $(v+1)^{th}$ block, shown in following Equation (12) to perform differential encoding.

$$B_{43}^{v+1} = S_{44}^{v+1} B_{43}^v \quad (12)$$

Herein, an $(i,t)^{th}$ element of the matrix $B_{43}^{v+1}$ is transmitted through an $i^{th}$ transmit antenna at a $t^{th}$ time.

One difference between Equation (12) and Equation (5) of the conventional technique is that the present invention uses the matrix $P_{44}$ in a process of creating the matrix $S_{44}^{v+1}$ while the conventional method uses the matrix $B_{44}$. In further detail, a matrix having orthogonality and the same number of rows as the matrix $B_{43}^v$, i.e., a unitary matrix is used to create the matrix $S_{44}^{v+1}$. Therefore, the matrices $P_{44}$ and $B_{44}$ satisfy the above conditions. However, the matrix $P_{44}$ is formed by combining six free symbols '$a_1$', '$a_2$', '$a_3$', '$a_4$', '$a_5$', and '$a_6$' while the matrix $B_{44}$ is formed through combination of three symbols '$a_1$', '$a_2$', and '$a_3$'. In effect, the present invention has twice the number of symbols transmitted per unit time as compared with the conventional technique. Herein, the symbols '$a_1$', '$a_2$', '$a_3$', '$a_4$', '$a_5$', and '$a_6$' are free symbols and carry real data. The symbols '$a_7$' and '$a_8$' are restricted symbols and are determined by means of the free symbols.

Assuming the reception terminal uses two receive antennas, a channel gain matrix is defined by Equation (13).

$$h = \begin{bmatrix} h_{11} & h_{12} \\ h_{21} & h_{22} \\ h_{31} & h_{32} \end{bmatrix} \quad (13)$$

In Equation (13), an $h_{ij}$ denotes a channel gain between a $j^{th}$ transmit antenna and an $i^{th}$ receive antenna. If the channel gain is time-invariant with respect to two connected blocks, a receive signal received in the $v^{th}$ block is defined by Equation (14).

$$X_v = B_{43}^v h + W_v \quad (14)$$

The $X_v$ denotes a signal received during four symbol intervals through two receive antennas and is defined by Equation (15). The $W_v$ denotes a noise signal and is defined by Equation (16).

$$X_v = \begin{bmatrix} x_{v,11} & x_{v,12} \\ x_{v,21} & x_{v,22} \\ x_{v,31} & x_{v,32} \\ x_{v,41} & x_{v,42} \end{bmatrix} \quad (15)$$

$$W_v = \begin{bmatrix} w_{v,11} & w_{v,12} \\ w_{v,21} & w_{v,22} \\ w_{v,31} & w_{v,32} \\ w_{v,41} & w_{v,42} \end{bmatrix} \quad (16)$$

As described above, a signal $X_{v+1}$ defined by Equation (17) is received in the $v+1^{th}$ block. Herein, if Equation (12) is substituted into Equation (17), Equation (17) is represented by Equation (18).

$$X_{v+1} = B_{43}^{v+1} h + W_{v+1} \quad (17)$$

$$X_{v+1} = B_{43}^{v+1} h + W_{v+1} = S_{44}^{v+1} B_{43}^v h + W_{v+1} = S_{44}^{v+1} X_v + N_{v+1} \quad (18)$$

The noise component $N_{v+1}$ can be defined as Equation (19).

$$N_{v+1} = -S_{44}^{v+1} W_v + W_{v+1} \quad (19)$$

Since the matrix $S_{44}^{v+1}$ has orthogonality, the variance of the noise component is double and the distribution of the noise component is steadily maintained in Equation (18). In addition, Equation (18) can be expressed as Equation (20) in view of each element thereof:

$$\begin{bmatrix} x_{v+1,1,1} \\ -x^*_{v+1,2,1} \\ x_{v+1,1,2} \\ -x^*_{v+1,2,2} \\ x_{v+1,3,1} \\ -x^*_{v+1,1,4,1} \\ x_{v+1,3,2} \\ -x^*_{v+1,1,4,2} \end{bmatrix} = \quad (20)$$

$$\begin{bmatrix} x_{v,1,1} & x_{v,2,1} & x_{v,3,1} & x_{v,4,1} & 0 & 0 & 0 & 0 \\ -x^*_{v,2,1} & x^*_{v,1,1} & -x^*_{v,4,1} & x^*_{v,3,1} & 0 & 0 & 0 & 0 \\ x_{v,1,2} & x_{v,2,2} & x_{v,3,2} & x_{v,4,2} & 0 & 0 & 0 & 0 \\ -x^*_{v,2,2} & x^*_{v,1,2} & -x^*_{v,4,2} & x^*_{v,3,2} & 0 & 0 & 0 & 0 \\ 0 & 0 & 0 & 0 & x_{v,1,1} & x_{v,2,1} & x_{v,3,1} & x_{v,4,1} \\ 0 & 0 & 0 & 0 & -x^*_{v,2,1} & x^*_{v,1,1} & -x^*_{v,4,1} & x^*_{v,3,1} \\ 0 & 0 & 0 & 0 & x_{v,1,2} & x_{v,2,2} & x_{v,3,2} & x_{v,4,2} \\ 0 & 0 & 0 & 0 & -x^*_{v,2,2} & x^*_{v,1,2} & -x^*_{v,4,2} & x^*_{v,3,2} \end{bmatrix}$$

$$\begin{bmatrix} s_1 \\ s_2 \\ s_3 \\ s_4 \\ s_5 \\ s_6 \\ s_7 \\ s_8 \end{bmatrix} + \begin{bmatrix} n_{v+1,1,1} \\ -n^*_{v+1,1,2,1} \\ n_{v+1,1,1} \\ -n^*_{v+1,1,2,1} \\ n_{v+1,1,1} \\ -n^*_{v+1,1,2,1} \\ n_{v+1,1,1} \\ -n^*_{v+1,1,2,1} \end{bmatrix}$$

The receiver can detect the transmission signal $S_{v+1}$ ($S_{v+1} = (s_{v+1,1}, s_{v+1,2}, s_{v+1,3}, s_{v+1,4}, s_{v+1,5}, s_{v+1,6})$) by using a maximum likelihood detector, a minimum mean squared error detector, a zero-forcing detector, a V-BLAST detector, etc., which are well-known, on the basis of Equation (20).

Although the present invention relates to a new transmission matrix for enhancing a transmission rate of differential space-time block codes, and receiver structure is dependent on the transmitter structure, since various detection schemes can be used, any redundant description about the detectors is omitted.

Figure 3A:
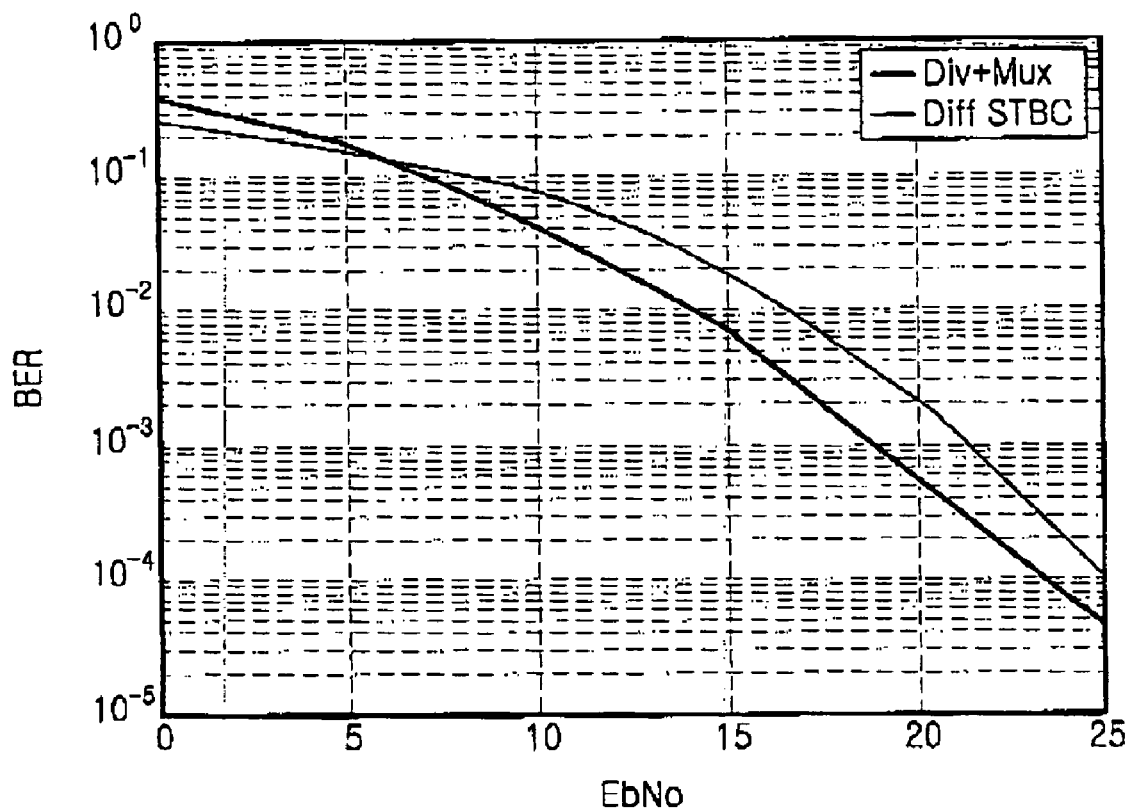
FIGS. 3A and 3B are graphs showing performance comparison of the conventional method and a method according to the present invention in relation to a receive antenna in view of a BER.
Figure 3B:
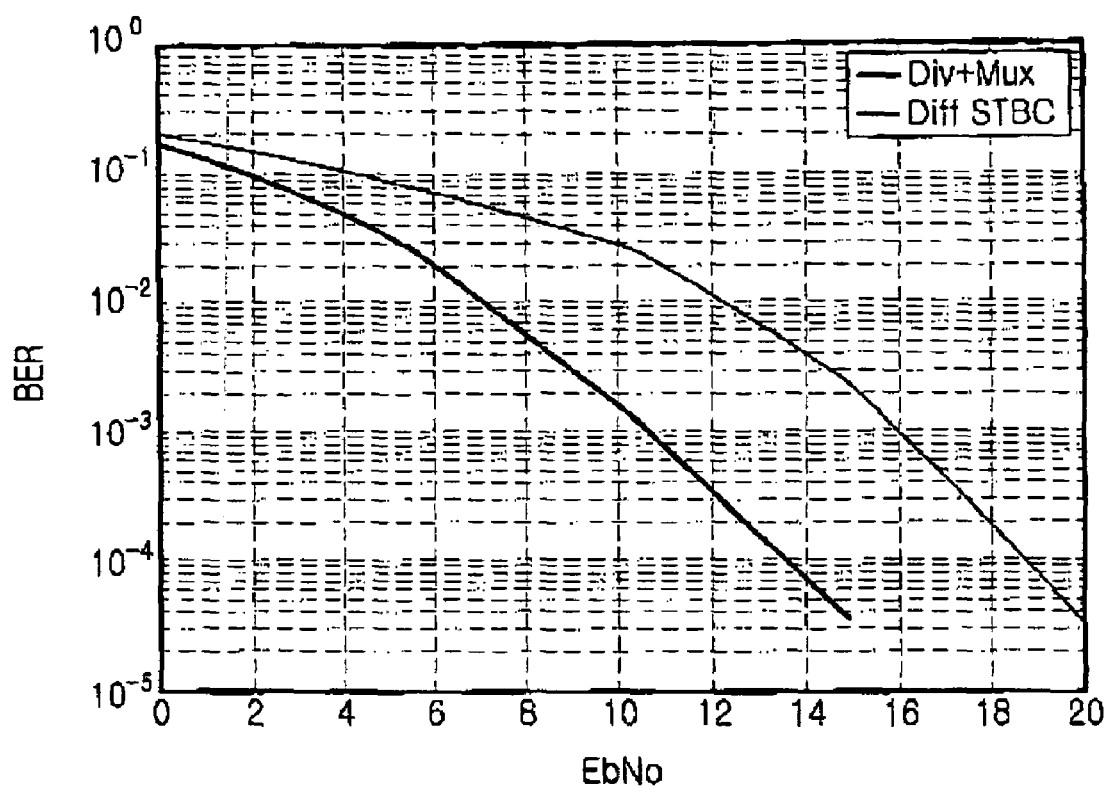

FIGS. 3A and 3B are graphs showing a performance comparison of the conventional method and the method according to the present invention in relation to a receive antenna in view of a bit error rate (BER).

That is, FIGS. 3A and 3B are graphs showing performance in view of a bit error rate when three transmit antennas are used. In particular, FIG. 3A shows performance when one receive antenna corresponding to three transmit antennas is used, and FIG. 3B shows performance when two receive antennas corresponding to three transmit antennas are used.

When three transmit antennas are used, BERs of the matrix $B_{44}$ for the conventional D-STBC and the matrix $P_{44}$ according to the present invention are shown in FIGS. 3A and 3B, respectively. First, when a bit transmission rate to be acquired is 3 bit/transmission, the modulation scheme used is shown in Table 1.

TABLE 1

| | $B_{44}$ | $P_{44}$ |
|---|---|---|
| Modulation | s1, s2, s3: 16 psk | S1, s2, ..., s6: QPSK |

As shown in FIG. 3A, when a single receive antenna, performance of the matrix $P_{44}$ is superior to that of the matrix $B_{44}$ by about 2.4 dB (BER=$10^{-3}$). However, since the conventional method has a higher diversity gain in an interval with a high SNR, the conventional method has a more rapid inclination of a BER curve as compared with that of the suggested method according to the present invention. Hence, as SNR increases, the performance difference between the conventional method and the suggested method decreases.

Next, as shown in FIG. 3B, when there are two receive antennas, the receive diversity gain increases to compensate for insufficient transmit diversity gain of the matrix $P_{44}$, and a multiplexing gain occurring by simultaneously transmitting multiple data is obtained so that the performance difference between the matrix $B_{44}$ and the matrix $P_{44}$ is more than the case of using a single receive antenna. That is, while the matrix $B_{44}$ transmits three number of 16 PSK signals, the matrix $P_{44}$ according to the present invention transmits six number of QPSK signals. For example, when two receive antennas are used, the matrix $P_{44}$ through the inventive method has a gain greater than that of the matrix $B_{44}$ by about 5.3 dB in 'BER=$10^{-3}$'.

The whole diversity gain of a communication link is obtained by multiplying a transmit diversity gain, acquired in the transmission terminal, by a receive diversity gain acquired in the reception terminal. Herein, performance improvement relating to a receive error rate through a diversity method in a wireless communication environment undergoing Rayleigh fading can be achieved depending on the increased amount of a diversity gain when the diversity gain is relatively small. The diversity gain can be obtained within a predetermined range and improvement of the diversity gain should not go beyond a particular limit.

Accordingly, where the transmission terminal can obtain a sufficient diversity gain, a method capable of acquiring more of a multiplexing gain than a diversity gain is useful in view of an information theory. As described above, according to the present invention, since the reception terminal has already acquired a diversity gain having at least a predetermined value by using multiple receive antennas, a transmission terminal acquires the multiplexing gain while reducing the diversity gain by more than with the conventional method, so that the receive error rate of the whole system can be reduced.

That is, as described above, according to the present invention, although the transmit diversity gain is lowered more or less as compared with the conventional method, the number of symbols transmitted per unit time can increase with the same number of transmit antennas. Thus, the symbol transmission rate can increase as well. In further detail, since the present invention can acquire twice the symbol transmission rate at maximum as compared with the conventional D-STBC, the present invention can lower a modulation order so as to acquire the same bit transmission rate as the conventional D-STBC. Accordingly, the reception terminal can obtain receive performance superior to that of the conventional D-STBC scheme when the reception terminal can obtain a receive diversity gain using multiple receive antennas.

As described above, in a differential space-time block coding apparatus with a high transmission rate and a method thereof according to the present invention, it is possible to obtain a higher symbol transmission rate and maintain orthogonality of a transmission matrix in a communication system using multiple transmit antennas. In addition, according to the present invention, it is possible to obtain a higher performance in view of BER as compared with the conventional differential space-time block codes in a communication system using at least two receive antennas. Further, when differential modulation and demodulation is used in an environment or a system in which channel information is invalid in a transmission/reception terminal, it is possible to reduce complexity of the reception terminal without increasing complexity of the transmission terminal.

According to the present invention, when the same number of transmit antennas as the conventional technique is used, it is possible to increase the number of symbols transmitted per unit time and increase a symbol transmission rate due to an increase of the number of symbols. As a result, when the reception terminal can acquire a receive diversity gain using multiple receive antennas, the present invention is superior to the conventional differential space-time block coding method in view of performance.

While the invention has been shown and described with reference to certain preferred embodiments thereof, it will be understood by those skilled in the art that various changes in form and details may be made therein without departing from the spirit and scope of the invention. Consequently, the scope of the invention should not be limited to the embodiments, but should be defined by the appended claims and equivalents thereof.

What is claimed is:

1. A differential space-time block coding apparatus with a high symbol transmission rate in a wireless communication system which includes a symbol mapper, a delayer, and a distributor and uses multiple receive antennas, the apparatus comprising:

a restricted symbol calculating unit for receiving a plurality of symbols mapped and outputted from the symbol mapper, and calculating at least one restricted symbol by using free symbols including real information which are the received plurality of symbols mapped and outputted from the symbol mapper; and a space-time encoder for receiving the plurality of symbols mapped and outputted from the symbol mapper and the at least one restricted symbol from the restricted symbol calculating unit, and generating a transmission matrix by space-time coding, wherein the transmission matrix is a unitary matrix having orthogonality with respect to complex signals and each restricted symbol is created through a combination of the free symbols, and wherein in the case of 2 transmission antennas the transmission matrix is defined by, $$P_{22} = \begin{bmatrix} a_1 & a_2 \\ a_3 & a_4 \end{bmatrix}, a_1 a_2^* + a_3 a_4^* = 0, a_4 = -2a_1^* a_2 a_3,$$

and wherein $a_1$, $a_2$, $a_3$ are free symbols and $a_4$ is a restricted symbol.

2. The differential space-time block coding apparatus as claimed in claim 1, wherein in the case of 3 or 4 transmission antennas the transmission matrix is defined by, $$P_{44} = \begin{bmatrix} a_1 & a_2 & a_5 & a_6 \\ a_2^* & -a_1^* & a_6^* & -a_5^* \\ a_3 & a_4 & a_7 & a_8 \\ a_4^* & -a_3^* & a_8^* & -a_7^* \end{bmatrix} = \begin{bmatrix} A_1 & A_3 \\ A_2 & A_4 \end{bmatrix}$$

$A_1 A_2^H + A_3 A_4^H = 0$, $A_4 = -2 A_2 A_1^H A_3$, and wherein $a_1$, $a_2$, $a_3$, $a_4$, $a_5$, $a_6$ are free symbols and $a_7$ and $a_8$ are restricted symbols.

3. The differential space-time block coding apparatus as claimed in claim 2, wherein elements of transmission matrix $B_{43}^v$ are transmitted in a predetermined $v^{th}$ block through a predetermined transmit antenna at a predetermined time, a symbol $S_v$ of inputted binary data is modulated to a symbol $S_{v+1}$ and the modulated symbol is substituted in the matrix $P_{44}$ so as to create a matrix $S_{44}^{v+1}$ in a $v+1^{th}$ block following the predetermined block, and then, in order to perform a differential encoding function, the matrix $B_{43}^v$ is multiplied by the matrix $S_{44}^{v+1}$ so as to calculate a new matrix $B_{43}^{v+1}$ to be transmitted in the $v+1^{th}$ block by $B_{43}^{v+1} = S_{44}^{v+1} B_{43}^v$, wherein when a reception terminal uses two receive antennas and a channel gain matrix is defined by $$h = \begin{bmatrix} h_{11} & h_{12} \\ h_{21} & h_{22} \\ h_{31} & h_{32} \end{bmatrix},$$

wherein an $h_{ij}$ is a channel gain for a $j^{th}$ transmit antenna and an $i^{th}$ receive antenna.

4. The differential space-time block coding apparatus as claimed in claim 3, wherein if the channel gain is time-invariant with respect to two consecutive blocks, a signal received in any predetermined block is defined by $X_v = B_{43}^v h + W_v$, wherein the $X_v$ denotes a signal received during four symbol intervals through two receive antennas and is defined by $$X_v = \begin{bmatrix} x_{v,11} & x_{v,12} \\ x_{v,21} & x_{v,22} \\ x_{v,31} & x_{v,32} \\ x_{v,41} & x_{v,42} \end{bmatrix},$$

wherein an $X_{v,ij}$ is a signal received during an $i^{th}$ symbol interval through a $j^{th}$ receive antenna and the $W_v$ denotes a noise signal and is defined as $$W_v = \begin{bmatrix} w_{v,11} & w_{v,12} \\ w_{v,21} & w_{v,22} \\ w_{v,31} & w_{v,32} \\ w_{v,41} & w_{v,42} \end{bmatrix},$$

wherein a $W_{v,ij}$ is a noise signal generated during an $i^{th}$ symbol interval through a $j^{th}$ receive antenna.

5. The differential space-time block coding apparatus as claimed in claim 3, wherein a signal received in the $v+1^{th}$ block includes a signal $X_{v+1}$ defined as $X_{v+1} = B_{43}^{v+1} h + W_{v+1}$, and $X_{v+1} = B_{43}^{v+1} h + W_{v+1} = S_{44}^{v+1} B_{43}^v h + W_{v+1} = S_{44}^{v+1} X_v + N_{v+1}$, wherein the $N_{v+1}$ denotes a noise component.

6. The differential space-time block coding apparatus as claimed in claim 5, wherein the noise component $N_{v+1}$ is defined as $N_{v+1} = -S_{44}^{v+1} W_v + W_{v+1}$.

7. A differential space-time block coding method with a high symbol transmission rate in a wireless communication system which includes a symbol mapper, a delayer, and a distributor and uses multiple receive antennas, the method comprising the steps of:

receiving a plurality of symbols mapped and outputted from the symbol mapper by a restricted symbol calculating unit, and calculating at least one restricted symbol by using free symbols including real information which are the received plurality of symbols mapped and outputted from the symbol mapper;

receiving the symbols sent from the symbol mapper and the restricted symbols from the restricted symbol calculating unit by a space time encoder, and generating a transmission matrix by space-time coding, wherein the transmission matrix is a unitary matrix having orthogonality with respect to complex signals and each restricted symbol is created through a combination of the free symbols, and wherein in the case of 2 transmission antennas the transmission matrix is defined as, $$P_{22} = \begin{bmatrix} a_1 & a_2 \\ a_3 & a_4 \end{bmatrix}, \; a_1 a_2^* + a_3 a_4^* = 0, \; a_4 = -2 a_1^* a_2 a_3,$$

and wherein $a_1$, $a_2$, and $a_3$ are free symbols and $a_4$ is a restricted symbol.

8. The differential space-time block coding method as claimed in claim 7, wherein in the case of 3 or 4 transmission antennas the transmission matrix is defined as $$P_{44} = \begin{bmatrix} a_1 & a_2 & a_5 & a_6 \\ a_2^* & -a_1^* & a_6^* & -a_5^* \\ a_3 & a_4 & a_7 & a_8 \\ a_4^* & -a_3^* & a_8^* & -a_7^* \end{bmatrix} = \begin{bmatrix} A_1 & A_3 \\ A_2 & A_4 \end{bmatrix}$$

$A_1 A_2^H + A_3 A_4^H = 0$, $A_4 = -2 A_2 A_1^H A_3$, and wherein $a_1$, $a_2$, $a_3$, $a_4$, $a_5$, $a_6$ are free symbols and $a_7$ and $a_8$ are restricted symbols.

9. The differential space-time block coding method as claimed in claim 8, wherein elements of transmission matrix $B_{43}^v$ are transmitted in a predetermined $v^{th}$ block through a predetermined transmit antenna at a predetermined time, a symbol $S_v$ of inputted binary data is modulated to a symbol $S_{v+1}$ and the modulated symbol is substituted in the matrix $P_{44}$ so as to create a matrix $S_{44}^{v+1}$ in a $v+1^{th}$ block following the predetermined block, and then, in order to perform a differential encoding function, the matrix $B_{43}^v$ is multiplied by the matrix $S_{44}^{v+1}$ so as to calculate a new matrix $B_{43}^{v+1}$ to be transmitted in the v+1$^{th}$ block by $$B_{43}^{v+1} = S_{44}^{v+1} B_{43}^{v},$$

wherein when a reception terminal uses two receive antennas, a channel gain matrix is defined as $$h = \begin{bmatrix} h_{11} & h_{12} \\ h_{21} & h_{22} \\ h_{31} & h_{32} \end{bmatrix},$$

wherein an $h_{ij}$ is a channel gain for a $j^{th}$ transmit antenna and an $i^{th}$ receive antenna.

10. The differential space-time block coding method as claimed in claim 9, wherein if the channel gain is time-invariant with respect to two consecutive blocks, a signal received in any predetermined block is defined as $$X_v = B_{43}^{v} h + W_v,$$

wherein the $X_v$ denotes a signal received during four symbol intervals through two receive antennas and is defined as $$X_v = \begin{bmatrix} x_{v,11} & x_{v,12} \\ x_{v,21} & x_{v,22} \\ x_{v,31} & x_{v,32} \\ x_{v,41} & x_{v,42} \end{bmatrix},$$

wherein an $X_{v,ij}$ is a signal received during an $i^{th}$ symbol interval through a $j^{th}$ receive antenna and the $W_v$ denotes a noise signal and is defined as $$W_v = \begin{bmatrix} w_{v,11} & w_{v,12} \\ w_{v,21} & w_{v,22} \\ w_{v,31} & w_{v,32} \\ w_{v,41} & w_{v,42} \end{bmatrix},$$

wherein a $W_{v,ij}$ is a noise signal generated during an $i^{th}$ symbol interval through a $j^{th}$ receive antenna.

11. The differential space-time block coding method as claimed in claim 9, wherein a signal received in the v+1$^{th}$ block includes a signal $X_{v+1}$ defined as, $$X_{v+1} = B_{43}^{v+1} h + W_{v+1}, \text{ and}$$

$$X_{v+1} = B_{43}^{v+1} h + W_{v+1} = S_{44}^{v+1} B_{43}^{v} h + W_{v+1} = S_{44}^{v+1} X_v + N_{v+1},$$

wherein the $N_{v+1}$ denotes a noise component.

12. The differential space-time block coding method as claimed in claim 11, wherein the noise component $N_{v+1}$ is defined as $$N_{v+1} = -S_{44}^{v+1} W_v + W_{v+1}.$$

* * * * *